April 27, 1954     F. G. HODELL     2,676,510

SCREW DRIVER SLOT WITH DRIVER WEDGING MEANS

Filed Sept. 23, 1950

INVENTOR.
FREDERICK G. HODELL
BY Hudson, Boughton,
Williams, David & Hoffmann.
ATTORNEYS Patented Apr. 27, 1954

2,676,510

UNITED STATES PATENT OFFICE 2,676,510

SCREW DRIVER SLOT WITH DRIVER WEDGING MEANS

Frederick G. Hodell, Gates Mills, Ohio, assignor to The National Screw & Manufacturing Company, Cleveland, Ohio, a corporation of Ohio Application September 23, 1950, Serial No. 186,455

1 Claim. (Cl. 85—45)

The present invention relates to threaded fasteners of the type having a straight transverse driver receiving slot and, more particularly, to threaded fasteners of the type referred to having a head in which the slot is formed.

The principal object of the invention is the provision of a novel and improved threaded fastener of the type having a straight transverse slot for receiving a driver, which slot is partly closed by inwardly projecting flanges formed by a depression on the head produced as by a punch and so shaped that among other advantages the fastener can be wedged upon and made to adhere to the point of a driver adapted to drive the same.

Another object of the invention is the provision of a threaded fastener of the character referred to so constructed that a wire or the like can be threaded or laced through the driver slot and the parts thus detachably connected together.

Another object of the invention is the provision of a threaded fastener of the character referred to, the transverse slot of which is so shaped that an ornamental cap or the like can be readily attached thereto.

Another object of the invention is the provision of a threaded fastener of the character referred to which can be readily produced or formed from a conventional fastener having a straight driver slot therein either before or after the fastener is driven.

Another object of the invention is the provision of a novel and improved tool for making fasteners of the character referred to from conventional fasteners having a straight driver slot therein and which tool can be used as a driver for the fasteners, if desired.

The invention resides in certain constructions and combinations and arrangements of parts and further objects and advantages thereof will be apparent to those skilled in the art to which the invention relates from the following description of the preferred embodiments thereof described with reference to the accompanying drawings forming a part of this specification, and in which Fig. 1 is an elevational view of a headed fastener embodying the present invention;

Figure 1:
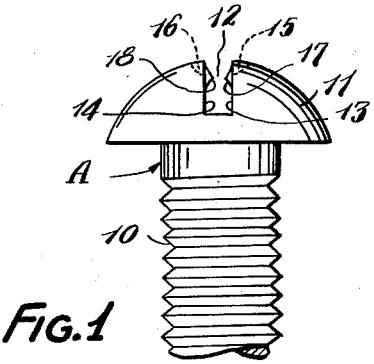
Figure 2:
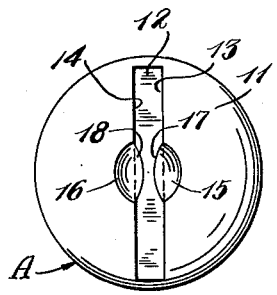
Fig. 2 is a plan view of the fastener shown in Fig. 1.

While the invention may be incorporated in any fastener having a transverse slot in one end adapted to receive the blade of a driving tool, it is herein shown and described as incorporated in a round headed bolt or machine screw. The screw shown in the drawings and designed generally as A is a conventional round headed machine screw modified to incorporate the present invention and comprises the usual threaded shank 10 and round head 11. The head 11 has a straight transverse driver slot 12 cut therein. The slot 12 has straight parallel walls 13 and 14 and is of conventional form except for the fact that portions of the head at or adjacent to the longitudinal centerline of the fastener are depressed as at 15, 16 by a punch or the like having a spherically-shaped end. The depressions are generally semi-spherical in shape and their formations cause portions of the metal or material of the head of the screw at opposite sides of the slot to flow or be punched inwardly to form overhanging flanges or projections 17, 18 at opposite sides of the slot and adjacent to the longitudinal centerline of the fastener. The flanges 17, 18 partly close the slot adjacent to its outer or open side.

Figure 3:
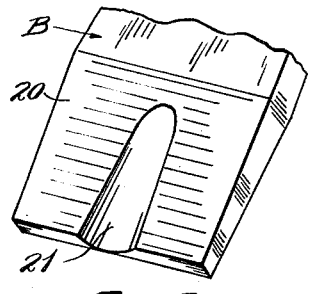
Fig. 3 is a perspective view of the blade and of a driver tool particularly adapted for use with the fastener shown in Figs. 1 and 2.
Figure 4:
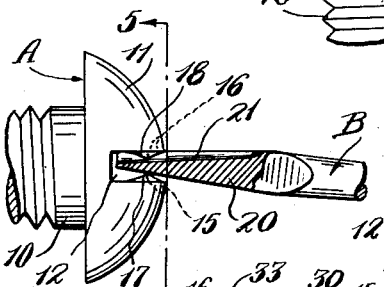
Fig. 4 is an elevational view showing the fastener of Figs. 1 and 2 wedged upon and adhering to the point of the blade of the driver tool shown in Fig. 3.

The construction of the slot 12 referred to has many advantages; for example, it can be employed as a means to permit the fastener to be wedged on and adhere to a driving tool of the type shown in Fig. 3. The tool, designated generally as B, shown in Fig. 3 is similar to a conventional straight-bladed screw driver except that the blade 20 has a groove 21 in one face thereof which extends from the free end of the blade longitudinally of the screw driver a distance greater than the normal depth of the slot 12 in the fastener with which it is intended to be used. When a fastener A of the construction referred to is placed or forced onto the blade 20 of the driver B in the manner shown in Fig. 4, one of the flanges or projections 17, 18, in the present instance 18, is received freely in the groove 21 and performs no function while the other flange, in the present instance 17, is engaged by the opposite face of the driver blade and forces or wedges the flat side or face of the driver blade having the groove 21 therein into tight frictional contact with the flat portion of the side 14 of the slot adjacent thereto. The projection of the flanges 17, 18 and the thickness of the driver blade is preferably such that the driver blade is clear of the bottom of the slot, as shown in Fig. 4, when the fastener is first assembled therewith. The fact that the contact between the flat side of the driver blade and the flanges 17, 18 engaged thereby, in the present instance 17, is but slightly more than a point contact, causes the adjacent surfaces at the opposite side of the driver blade and slot to lie flat against each other and the parts to wedge and frictionally adhere together. After the fastener A has been started in a hole and its resistance to turning increased to a substantial amount, the driver blade 20 can be forced to the bottom of the slot 12 by merely tapping the outer end of the driver tool as with a hammer. This may deform the flange or projection 17 or 18 in engagement with the flat side of the driver blade but, in any event, the opposite flange or projection which is loosely received in the groove 21 and is not deformed may be used for a subsequent operation if it becomes necessary or desirable to re-use the screw.

Figure 6:
Fig. 6 is an elevational view of a tool for making the fastener shown in the preceding figures from a conventional fastener of similar form, which tool can be used as a driver for the fastener, if desired.
Figure 7:
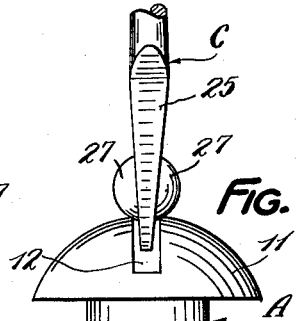
Fig. 7 is a view similar to Fig. 6 but showing the tool in position upon the head of a fastener similar to the fastener shown in Fig. 1 before being modified to incorporate the present invention.
Figure 5:
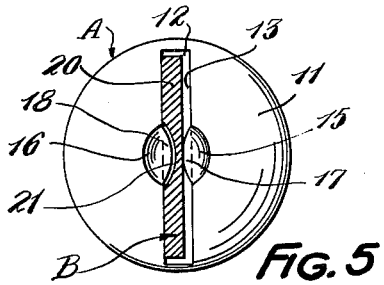
Fig. 5 is a sectional view approximately on the line 5—5 of Fig. 4.
Figure 9:
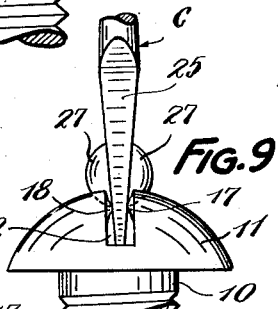
Fig. 9 is a view similar to Fig. 7 after the recess in the center of the head of the screw has been formed.
Figure 8:
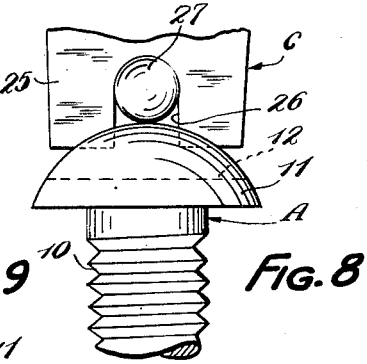
Fig. 8 is a side elevational view of the fastener and driver shown in Fig. 7, and parts being rotated 90°.

A tool, designated generally as C, and suitable for forming the depressions in the head of the fastener and which tool may be used as a driver, if desired, is shown in Figs. 6, 7 and 8. Referring to these figures, the tool shown therein is similar to a conventional flat bladed screw driver except that the central portion of the point or blade 25 is slotted as at 26 and the blade is provided at the upper end of the slot with a spherical-like formation 27 having a diameter approximately twice or three times as great as the thickness of the blade at the point where the formation is formed. The spherical-like formation 27 projects from opposite sides of the blade as clearly shown in Fig. 6. Figs. 7 and 8 show the position of the tool and fastener prior to the formation of the recesses 15, 16 in the head of the fastener. With a tool in this position, it is used like a punch and the end is struck by a hammer or the like. This forces the tool to the position shown in Fig. 9 forming the recesses 15, 16 and the overhanging flanges or projections 17, 18 previously referred to.

It will be apparent that the tool C may be used as a driver for the fastener, if desired, and that the depression or recesses 15, 16 may be formed after the fastener A is in place or prior thereto, as desired. Attention is called to the fact that with the parts assembled as shown in Figs. 7 and 8, the lower end of the blade of the driver C clears the bottom of the slot 12 in the fastener. After the depressions 15, 16 have been formed, the end of the driver engages the bottom of the slot 12. This construction limits the distance that the spherical-like formation 27 on the tool can be driven into the head of the fastener and assures all of the recesses 15, 16 in similar screws being substantially alike. Alternatively the recesses 15, 16 may be formed by any punch having a spherical or semi-spherical like end of suitable diameter and may be produced on machines as well as by hand.

Figure 10:
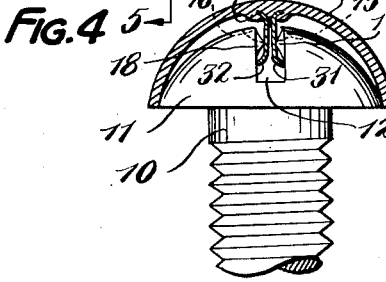
Fig. 10 is an elevational view of the fastener shown in Figs. 1 and 2 having an ornamental head applied thereto.
Figure 11:
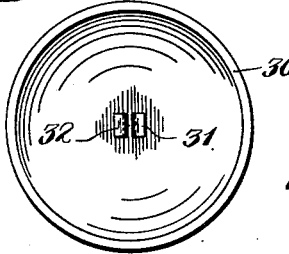
Fig. 11 is a bottom view of the ornamental head.

The particular head construction referred to is especially adapted for the attachment of an ornamental cap thereo, as shown in Fig. 10. The cap may be formed of any suitable material, such as sheet metal, or plastic, and may be of any desired shape and covering a part or the entire head of the fastener and preferably presents a pleasing and decorative appearance. The cap 30 shown, is dome-shape and covers the entire face of the screw head 11. The cap 30 includes two spring prongs 31, 32 which have laterally projecting feet or projections at opposite ends thereof, respectively. One end of each of the prongs is attached to the central underside portion of the cap, as by swaging material of the cap over the feet or projections thereon. The lower projections or feet are arranged to project outwardly and the construction is such that the outer ends of the prongs tend to spread. The spread of the prongs 31, 32 and the resiliency thereof are such that when they are inserted in the open top of slot 12 and the cap pressed towards the head of the fastener, the prongs 31, 32 yieldingly move inwardly and slide past the projections 17, 18. When the lower feet or projections on the prongs pass over the high point of the projections 17, 18, the prongs spread and move the lower feet beneath the projections and thus secure the cap to the head. The cap may be quickly attached to the head by merely inserting the prongs in the slot therein, and the feet of the prongs cooperate with the inwardly facing abutments 17, 18 to firmly hold the cap to the fastener head. The feet or projections adjacent to the lower ends of the prongs engage the abutments and tend to cam the prongs inwardly to maintain the cap in firm engagement with the screw head. In addition, this construction eliminates the necessity of securing a precise dimensioning of the length of the prongs. The cap can be made to fit snugly against the face of the fastener head, if desired, because the boss or thickened portion 33 of the head formed when the prongs 31, 32 are secured thereto can be accommodated in the recess or recesses 15, 16, if desired.

While the preferred forms of the invention have been described in considerable detail, it will be apparent that the invention is not limited to the constructions shown, and it is my intention to cover hereby, all adaptations, modifications and changes therein, which come within the practice of those skilled in the art to which the invention relates and the scope of the appended claim.

Having thus described my invention, I claim:

A fastener comprising a threaded body having a transverse straight parallel sided slot in one end adapted to receive a blade-like driving tool, the opposite sides of said slot having opposed relatively short projections located centrally of and spaced from the ends of said slot and overhanging the bottom thereof, said projections being convex longitudinally of said slot, said projections being spaced from one another a distance to receive a part of the blade of a tool driver therebetween, the outwardly facing surfaces of said projections being concave and having the form of sections of a sphere-like object the diameter of which is greater than the width of said slot and which is inset relative to the slotted end surface of the fastener.

References Cited in the file of this patent

UNITED STATES PATENTS

| Number | Name | Date |
|---|---|---|
| 915,068 | Bowen | Mar. 16, 1909 |
| 1,056,095 | Gross | Mar. 18, 1913 |
| 1,476,653 | Stanton | Dec. 4, 1923 |
| 1,934,347 | Flesselles | Nov. 7, 1933 |
| 1,997,422 | Lorenzen et al. | Apr. 9, 1935 |
| 2,160,244 | West | May 30, 1939 |
| 2,304,704 | O'Leary | Dec. 8, 1942 |
| 2,322,509 | De Vellier | June 22, 1943 |
| 2,431,628 | Waarich | Nov. 25, 1947 |

FOREIGN PATENTS

| Number | Country | Date |
|---|---|---|
| 178,160 | Great Britain | Apr. 10, 1922 |